US008305376B2

(12) United States Patent
Ran et al.

(10) Patent No.: US 8,305,376 B2
(45) Date of Patent: Nov. 6, 2012

(54) LOCALLY UPDATING A THREE-DIMENSIONAL MODEL

(75) Inventors: Ruijiang Ran, Westford, MA (US);
Chun-Yi Hu, Lexington, MA (US);
Hailong Li, Acton, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 1326 days.

(21) Appl. No.: 11/734,688

(22) Filed: Apr. 12, 2007

(65) Prior Publication Data
US 2008/0255809 A1 Oct. 16, 2008

(51) Int. Cl.
*G06T 17/00* (2006.01)
(52) U.S. Cl. ..................................... 345/420
(58) Field of Classification Search .................. None
See application file for complete search history.

(56) References Cited

U.S. PATENT DOCUMENTS

| 5,923,573 | A  | * | 7/1999 | Hatanaka | 703/2 |
| 6,944,513 | B1 | * | 9/2005 | Tomomitsu et al. | 700/98 |
| 2002/0008700 | A1 |  | 1/2002 | Fuki |  |
| 2003/0025692 | A1 |  | 2/2003 | Lu et al. |  |
| 2003/0114947 | A1 | * | 6/2003 | Tanaguchi | 700/98 |
| 2004/0153824 | A1 | * | 8/2004 | Devarajan et al. | 714/38 |
| 2004/0167650 | A1 | * | 8/2004 | Nasu | 700/98 |
| 2005/0209831 | A1 |  | 9/2005 | Jungreis et al. |  |
| 2007/0091119 | A1 |  | 4/2007 | Jezyk et al. |  |

FOREIGN PATENT DOCUMENTS

| EP | 1 302 904 A2 | 4/2003 |
| JP | 06-083884 A | 3/1994 |
| JP | 2002-245101 A | 8/2002 |

OTHER PUBLICATIONS

Hsu, C., et al., "A Constraint-Based Manipulator Toolset for Editing 3D Objects," *Proceedings of the Symposium on Solid Modeling and Applications*, vol. 4, pp. 168-180 (May 14, 1997).
Parienté, F., et al., "Incremental and Localized Update of Convex Decomposition Used for Form Feature Recognition," *Computer Aided Design* 28(8), pp. 589-602 (Aug. 1996).
Bronsvoort, W.F., et al., "Multiple-View Feature Modelling for Integral Product Development," *Computer-Aided Design* 36(10), pp. 929-946 (Sep. 1, 2004).
Choi, J.W., et al., "Real-Time Management of Spatial Information of Design: A Space-Based Floor Plan Representation of Buildings," *Automation in Construction* 16(4), pp. 449-459 (Feb. 28, 2007).

* cited by examiner

*Primary Examiner* — Edward Martello
(74) *Attorney, Agent, or Firm* — Hamilton, Brook, Smith & Reynolds, P.C.

(57) ABSTRACT

Updating a three-dimensional model includes generating a three-dimensional model comprised of components, modifying one of the components, determining other components having a possible changing effect on the three-dimensional model as a result of modifying the one component, and constructing a modified version of the three-dimensional model by regenerating the modified component and the other components having the possible changing effect while not regenerating remaining ones of the components not having the possible changing effect. The modified version achieves the same result as revising the three-dimensional model by regenerating each one of components.

20 Claims, 6 Drawing Sheets

LOCALLY UPDATING A THREE-DIMENSIONAL MODEL

FIELD

This application relates to Computer-Aided Design (CAD), and more particularly, to local updates of a three-dimensional CAD model.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). Geometric entities that are trimmed surfaces correspond to faces bounded by edges, which correspond to trimmed curves; whereas, geometric entities that are points correspond to topological entities that are vertices. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. Parts and subassemblies may be used to design an assembly.

A solid modeling system may be a feature-based 3D CAD system wherein a part is constructed using various geometric building blocks, hereinafter referred to as features. Examples of features include bosses, fillets, chamfers, cuts, holes, shells, lofts, and sweeps. Commercially available feature-based modeling systems include the SolidWorks® 2007 software system available from SolidWorks Corporation of Concord, Mass.

A feature-based CAD system may be a history-based CAD system meaning that a particular feature acts on all features that have been previously included in a part and has no effect on features subsequently introduced to the part. Thus, the physical structure of a part constructed using a feature-based 3D CAD system is often dependent upon the order in which a design engineer creates the features. For example, if a boss is defined prior to and occupies the same space as a hole, material will be removed from the boss where the hole and boss intersect; on the other hand, if a boss is defined after the hole that occupies the same space, the boss will not have material removed where the hole and boss intersect.

Generally, history-based CAD systems define a part as an ordered list of features. Each feature in the ordered list has a corresponding regeneration algorithm that, in accordance with the feature's definition, modifies the geometry that results from the generation of the previously defined features in the ordered list. Essentially, a part is created by executing a sequence of feature operations. While creating a part, the design engineer typically adds features one by one to the part's feature list. To modify a feature, the design engineer changes the feature's data and then the CAD system recreates the part by regenerating every feature one by one in the order in which the design engineer originally introduced the features. All the features are typically regenerated sequentially according to the order in which the features were created to ensure that the design intent is preserved and the part is properly constructed by the CAD system. Additionally, utilizing an ordered list of features has the advantage of easily managing parametric changes.

Regenerating the entire part impacts the performance of the CAD system especially when a part is complex because the time and computing resources required to regenerate all the features may be considerable. Hence, the update process may be very slow, even when only a single parameter in one feature is modified.

SolidWorks® 2003 software addressed the performance impact caused from the regeneration of an entire part by only regenerating the modified feature and all features defined after the modified feature. The features defined after the modified feature are also regenerated to ensure that the later defined features have the proper effect on earlier defined features as well as the modified feature. Although the entire part may not be regenerated, slower performance may remain an issue when the modified feature is defined early in an historical sense because then a significant portion of the part must be regenerated. Regenerating the modified feature and all features defined after the modified feature facilitated the Rollback and Roll Forward commands in the SolidWorks® 2003 software product.

Additional performance improvements for state-of-the-art CAD systems are desirable. Such improvements can be realized by providing an efficient means to reduce the regeneration time necessary to update a CAD model. One such means, as will be discussed, reduces the number of features that need to be regenerated whenever a modification is made to a model.

SUMMARY OF THE INVENTION

In general, in one aspect, the invention features a computer-readable data storage medium having instructions for updating a three-dimensional model. The instructions cause a computer to (i) generate a three-dimensional model comprised of components, (ii) modify one of the components, (iii) determine other components having a possible changing effect on the three-dimensional model as a result of modifying the one component, and (iv) construct a modified version of the three-dimensional model by regenerating the modified component and the other components determined to have possible changing effects while not regenerating (i.e., maintaining and/or leaving unmodified) remaining ones of the components not having the possible changing effect. The modified version achieves the same result as revising the three-dimensional model by generating (regenerating) each one of components.

To determine the other components having the possible changing effect, instructions cause a computer to examine the modified component to discover whether a parent-child relationship exists with one of the other components, wherein the modified component is a parent of one of the other components. Additionally, instructions may cause a computer to examine the modified components to discover whether a topological relationship exists with one of the other components, wherein the modified component and one of the other components have an adjacent topological entity. Moreover, at least one extent of the modified component may be calculated to compare with a location of at least one other component for determining an intersection of the modified component and at least one of the other components.

In some embodiments, a representation of the three-dimensional model comprised of topological entities is constructed, and either (i) the topological entities constructed prior to modifying the component and associated with the other ones of the plurality of components are removed, or (ii) the topological entities constructed prior to modifying the component are modified to reflect a topological result from regenerating the modified one of the plurality of components and the other ones of the plurality of components. One of the topological entities may be reconstructed to maintain a valid model.

According to another embodiment, the present invention provides a computer-implemented method for updating a computer-aided design model. The computer-aided design model is defined as a set of components. A modification is applied to a first component, which is in the set of components. The set of components is analyzed for determining if a relationship exists between the first component and another component in the set. A relationship between the first and a second component is discovered, and data identifying the second component is stored in a data structure. The second component is examined to determine whether other relationships exist between the second component and other components in the set. Data identifying the other components in the set having other relationships with the second component is added to the data structure. The first component and the components identified by the identifying data are regenerated while the components not identified by the identifying data are not regenerated. Regenerating the components constructs a modified version of the computer-aided design model identical to the computer-aided design model revised by regenerating each one of the components in the set.

In some embodiments, the relationship between the first and a second component is a parent-child relationship, an adjacency relationship, or a spatial overlap relationship. Furthermore, the adjacency relationship may be caused by the first and the second component sharing the same topological entity. Additionally, a bounding box surrounding the first component and a bounding box surrounding the second component may be created, an intersection between the bounding boxes may be detected, and the existence of the spatial overlap relationship determined due to the intersection.

In other embodiments, the other relationships may be parent-child relationships, adjacency relationships, or spatial overlap relationships. Moreover, the first component may be a feature or a parameter.

In other embodiments, the invention method further includes (a) constructing a representation of the three-dimensional model comprised of topological entities and corresponding geometric entities, and (b) either (i) removing the topological entities constructed prior to applying the modification and associated with the ones of the plurality of components identified by the identifying data, or (ii) modifying the topological entities constructed prior to applying the modification in accordance with the result from regenerating the first component and the components identified by the identifying data.

According to another embodiment, at least one of the first component and the second component is a feature. The feature has a face merged with another face belonging to another feature not identified by the identifying data, and the face and the other face are separated prior to regenerating the first component and the components identified by the identifying data.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, with emphasis instead being placed upon illustrating embodiments of the present invention.

DETAILED DESCRIPTION OF THE INVENTION

A description of example embodiments of the invention follows.

The present invention enhances the performance of a 3D modeling system by determining the extent of a model that requires regeneration when a modification is made to the model. By analyzing parent-child, topological, and geometric relationships between CAD entities, the present invention determines which CAD entities may have a different affect on the model after the modification than before the modification. Only those CAD entities that may affect the model differently are then regenerated, producing the same revised model as would be produced by regenerating all CAD entities in the model, whether the CAD entities affect the model differently or not.

An advantage of the present invention is that updates to a three-dimensional model are localized thereby allowing the model to be updated more quickly. The update time is limited to and dependent on the size and complexity of a subset of model features rather than the size and complexity of the entire three-dimensional model. Performance of a CAD system that implements the present invention is improved because the entire model does not need to be updated, for example, when a parameter of a feature is modified or when a feature is edited. Another advantage of the present invention is that only updating a subset of model features utilizes less computing resources, which may allow computer modeling systems to be configured more sparingly with regards to computer hardware. Yet another advantage of the present invention is that the number of possible errors that occur when an entire three-dimensional model is regenerated by a CAD system may also be reduced. Possible errors may be due to the complexity of the CAD software and be manifested using a warning dialog. Although a possible error may be inconsequential, a design engineer may spend time determining whether the error is serious and spend time fixing the cause of the error.

Figure 1:
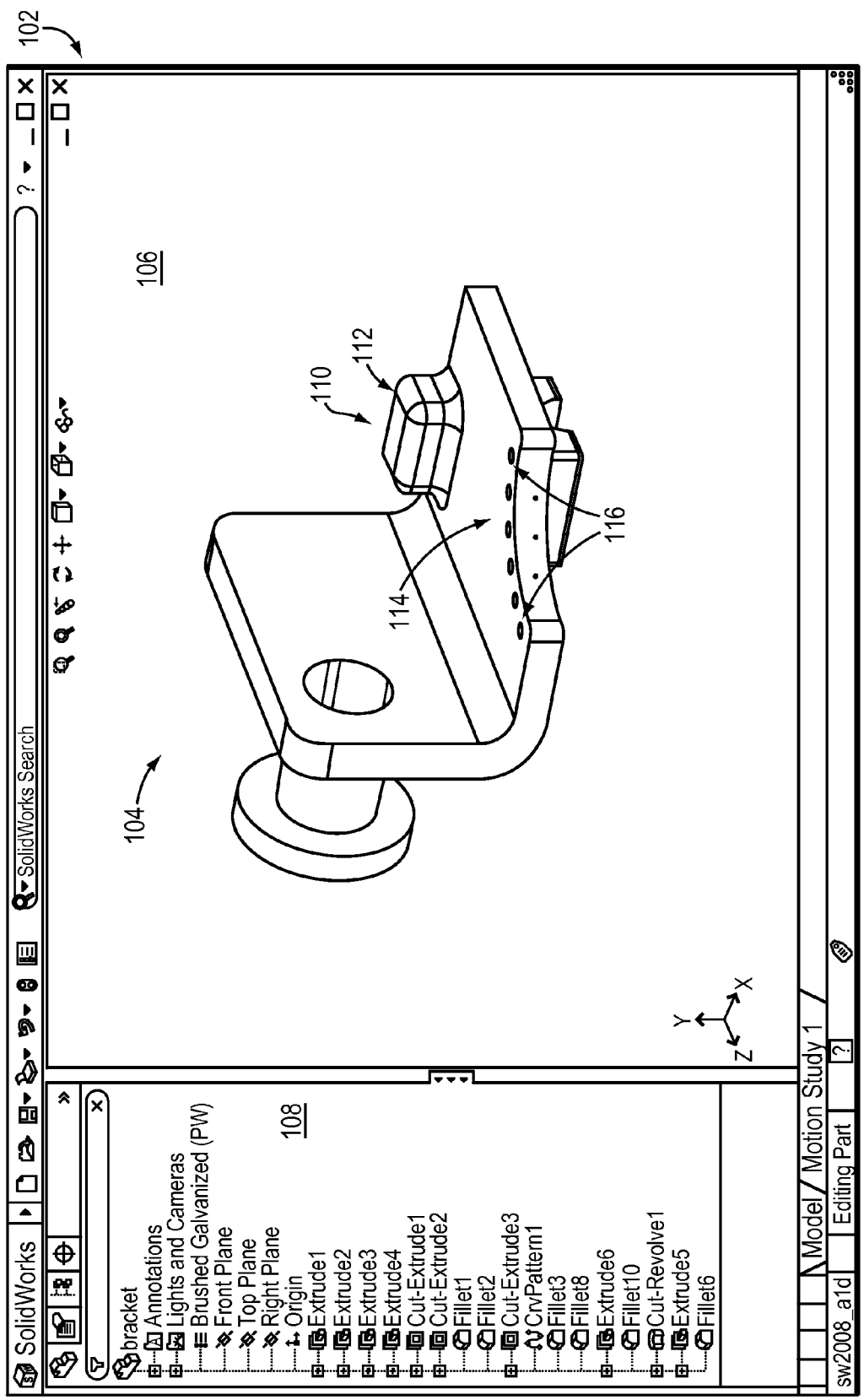
FIG. 1 is an illustration of a computer-generated model and a feature manager portion of a user interface displayed in a window in one embodiment of the present invention.

Referring now to FIG. 1, a window 102 displayed on a computer monitor is shown. The window 102 is generated by modeling software executed by a computerized modeling system, an example of which is later shown with reference to FIG. 6. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. Among other design elements, the model 104 includes a boss 110, a filleted edge 112, and an edge 114. The edge 114 is created by an extruded cut (not shown) and used to position a hole pattern 116. Implementations of the present invention also may include other window areas, such as a FeatureManager® window panel 108 in which the structure of an opened part, subassembly, assembly, or drawing is listed to help the design engineer visualize and manipulate the 3D model 104, as well as components of the 3D model 104. The FeatureManager window panel 108 presents the feature history to the design engineer as a hierarchical collection of features. The design engineer may be able to highlight a feature by selecting the name of the feature or an icon representing a feature in the FeatureManager window panel 108. U.S. Pat. No. 5,815,154 to Hirschtick et al discloses a system for modifying a model by allowing a design engineer to graphically manipulate a hierarchical collection of features.

Figure 2:
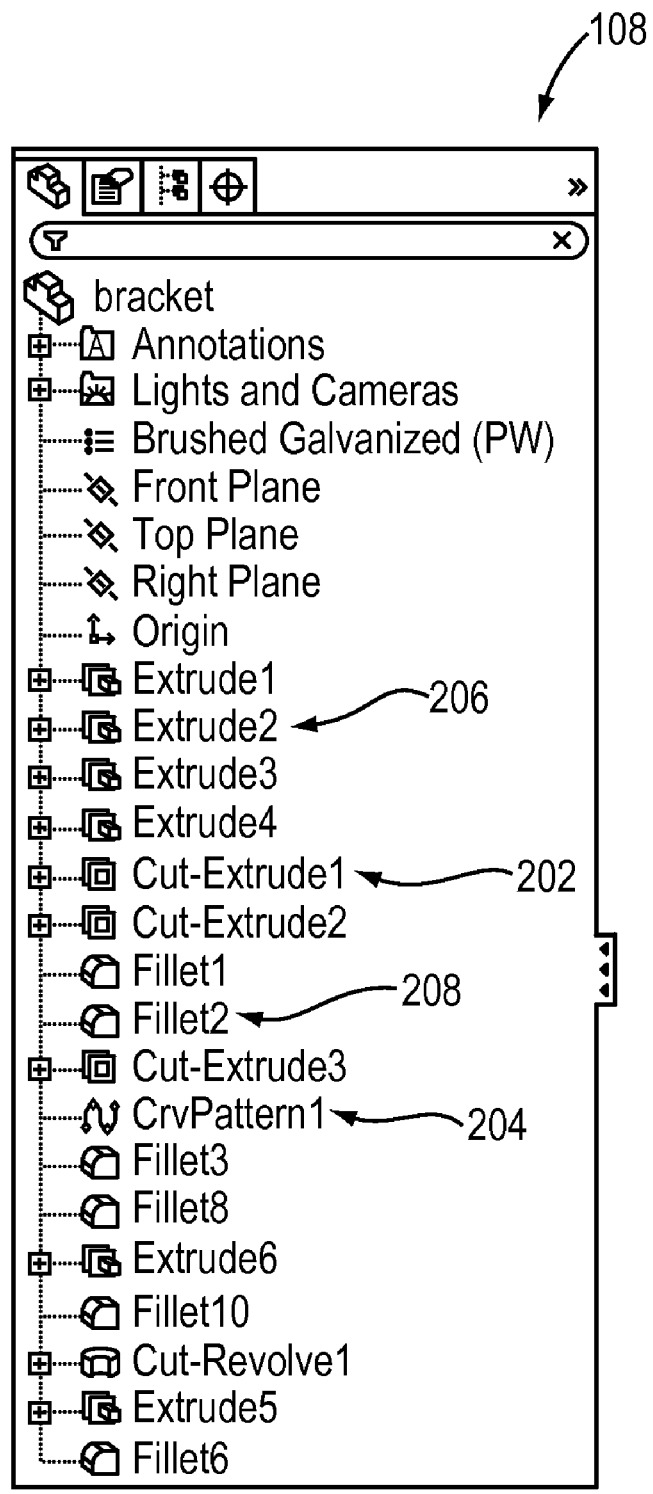
FIG. 2 is an illustration of a feature manager portion of the user interface displayed in the window shown in FIG. 1.

Referring now to FIG. 2, the FeatureManager window panel 108 is shown. The FeatureManager window panel 108 includes an ordered list of features in the model 104. Those features whose names are listed above other features were created before those other features. For example, the edge 114 shown in FIG. 1 was created by a feature named "Cut-Extrude1" 202 in FIG. 2. The hole pattern 116 shown in FIG. 1 corresponds to the name "CrvPattern1" 204 in FIG. 2. Since the name "Cut-Extrude1" 202 appears above the name "CrvPattern1" 204 in the FeatureManager window panel 108, the feature named "Cut-Extrude1" 202 was created prior to the feature named "CrvPattern1" 204. Therefore, a change in the feature named "Cut-Extrude1" 202 may cause a change in the feature named "CrvPattern1" 204. For example, the curvature of the hole pattern 116 may be dependent on the radius of the extruded cut that created edge 114. In this case, if the feature named "Cut-Extrude I" 202 was modified the present invention would regenerate the hole pattern 116 and avoid regenerating any other feature corresponding to a name listed above or below "Cut-Extrude1" 202 in the FeatureManager window panel 108 unless a feature has another type of dependency relationship to the modified extruded cut, as will be discussed.

Also shown in FIG. 2 is the text "Extrude2" 206 and the text "Fillet2" 208, which correspond to the boss 110 and the filleted edge 112 shown in FIG. 1, respectively. The text "Extrude2" 206 appears above the text "Fillet2" 208 in the FeatureManager window panel 108, and therefore, if the boss 110 is modified (e.g., widened in the z direction) then the filleted edge 112 should also be regenerated. The text "Extrude2" 206 also appears above the text "Cut-Extrude1" 202 and the text "CrvPattern1" 204. However, referring to FIG. 1, the boss 110 would not be affected by the extruded cut that created edge 114 or the hole pattern 116 unless the size of the boss 110 increases to a size where the boss 110 extends to the hole pattern 116 or the edge 114. Although the feature named "Cut-Extrude1" 202 is created after the boss 110 (as indicated by the ordered list of names in FIG. 2), the present invention avoids regenerating the feature named "Cut-Extrude1" 202 (and therefore recreating the edge 114), as well as the hole pattern 116 unless for example the boss 110 and edge 114 features spatially overlap. Additionally, any other features corresponding to names listed above or below "Fillet2" 208 in the FeatureManager window panel 108 are not regenerated unless a relationship such as a parent-child or geometric relationship exists.

The present invention determines which features may affect a part when a change is made in another feature. The present invention then only updates the modified feature and those features also affecting the part. By way of non-limiting example, the change may affect the physical structure of the part, a display attribute such as color or texture that needs to be propagated to other features, or other attributes such as a property of a material to be used in a manufacturing process. To determine which features to regenerate, the present invention searches for and analyzes relationships between features. For example: the present invention may discover a parent-child relationship between two features. Since the child feature may have a different affect on a part after a change is made to the parent feature, the present invention will ensure that the child feature is regenerated whenever the parent feature is regenerated. Similarly, other descendent features (e.g., grandchildren) will also be regenerated.

Other conditions that cause certain features to be regenerated include situations where two features have an adjacency relationship and where two features occupy the same model space. An adjacency relationship is created when two features share a common edge or face. This can occur when a later defined feature removes material from an earlier defined feature. As a result, the features have adjacent topological entities. Features may also share the same model space, which may cause one of the features to remove material from the other one of the features.

Figure 3:
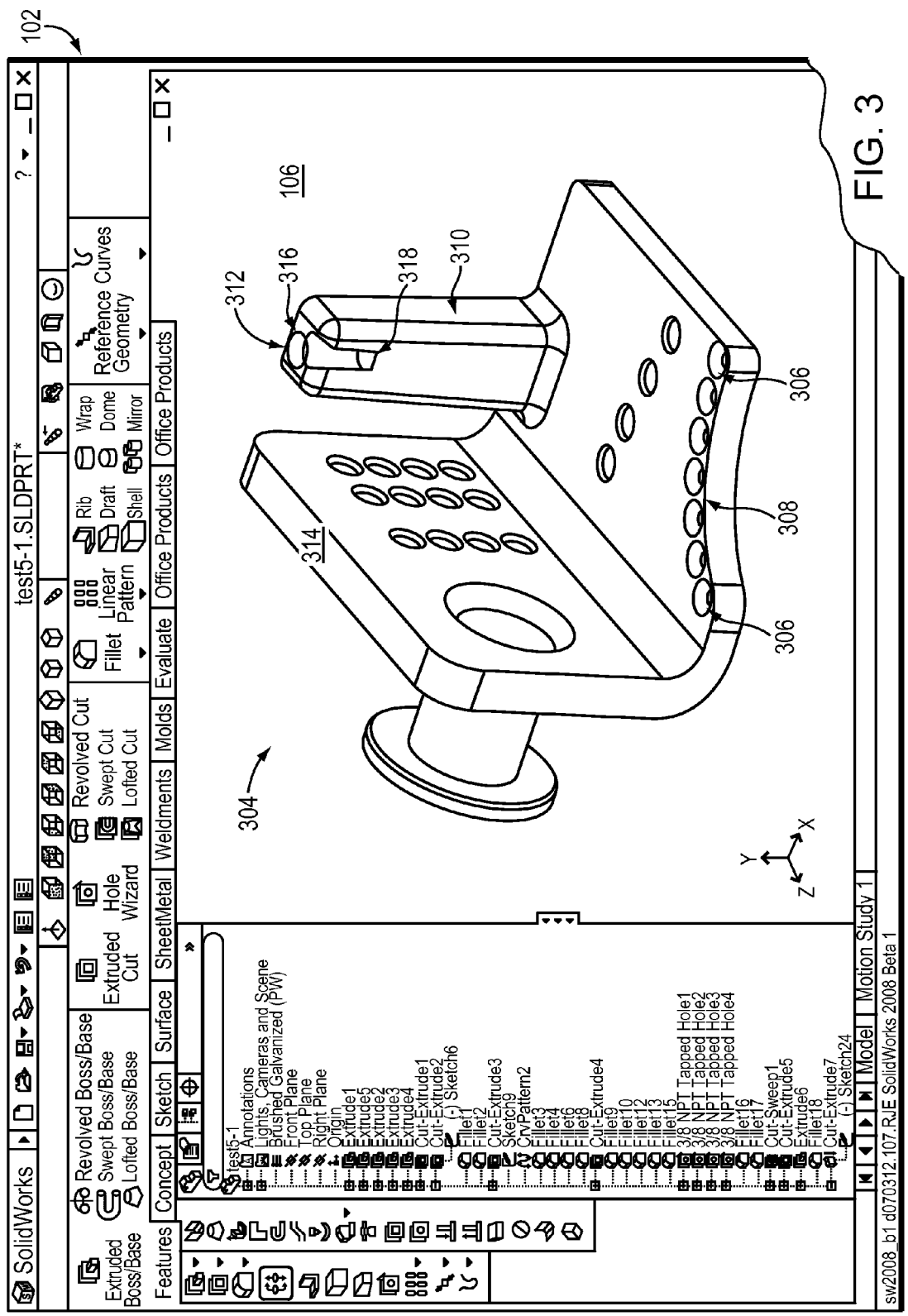
FIG. 3 is an illustration of a computer-generated model and a feature manager portion of a user interface displayed in a window in one embodiment of the present invention.

FIG. 3 illustrates relationships between various features that can cause features to be regenerated. For example, model 304 includes a hole pattern 306 in which each hole is filleted. Now presume that the hole pattern 306 is dependent on a location of an edge 308 created by an extruded cut (not shown). If the radius of the extruded cut that created edge 308 decreases, the radius of a curve on which the hole pattern 306 is aligned will also decrease. Moreover, the number of holes and hole fillets, or the size of the holes and hole fillets in the hole pattern 306 may decrease. Thus a change in the extruded cut that created the edge 308 may cause a change in the hole pattern 306 (e.g., the number or holes, the size of the holes, or the curvature of the pattern), and the hole fillets. A change in only the hole size, however, may only affect the hole fillets not the position or radius of the extruded cut.

Model 304 also includes a boss 310 and a second extruded cut 312, which removes material from the boss 310. The second extruded cut 312 is dependent upon a face 314 because the circular sketch 316 used to create the second extruded cut 312 is positioned on a plane extending from the face 314. Thus, a parent-child relationship exists between the face 314 and the second extruded cut 312. Although a parent-child relationship does not exist between the boss 310 and the second extruded cut 312, an adjacency relationship exists because the boss 310 and the second extruded cut 312 have adjacent edges, such as adjacent edge 318 created when the second extruded cut 312 removed material from the boss 310.

Figure 4:
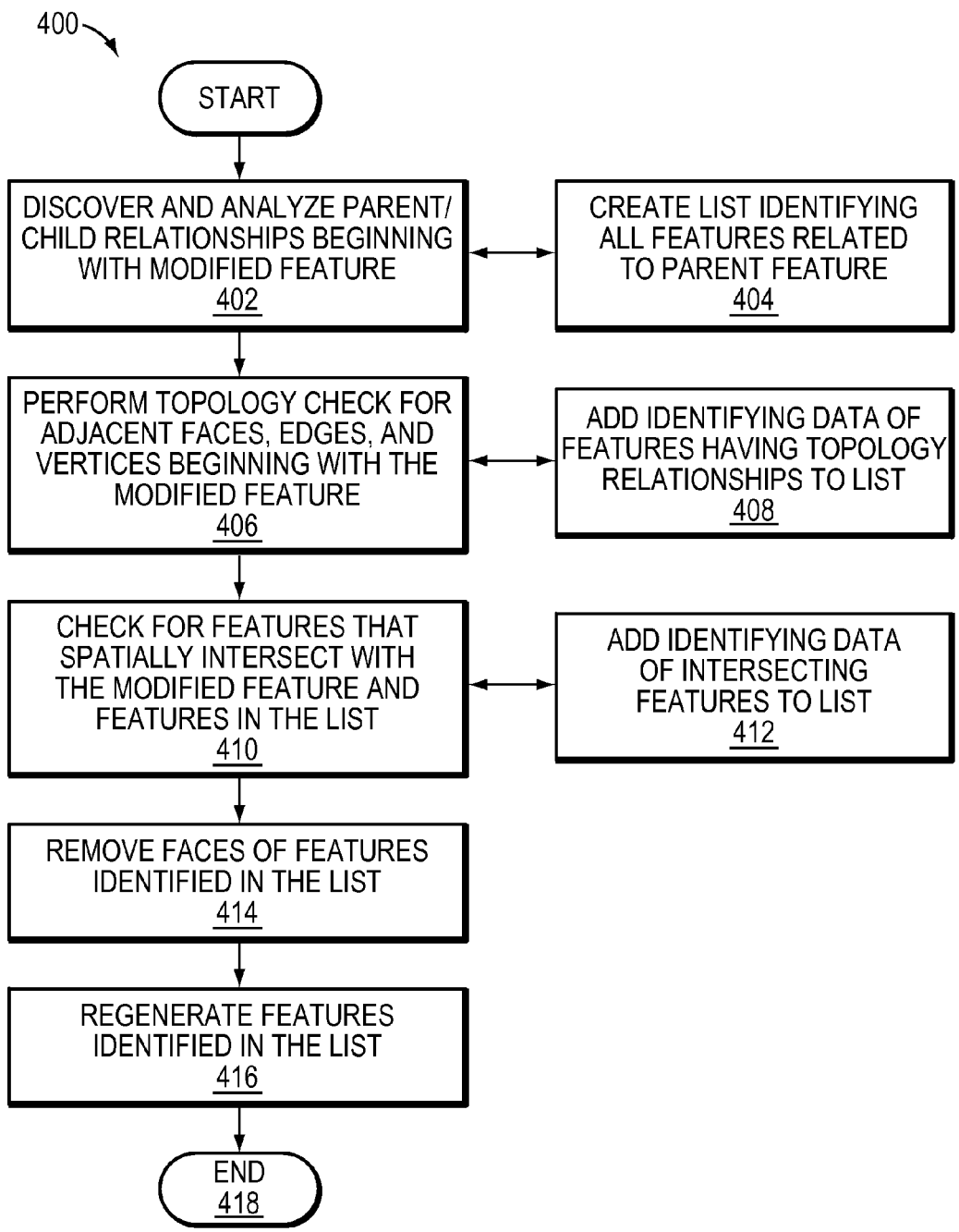
FIG. 4 is a flow diagram illustrating a process of one embodiment of the present invention.

Referring now to FIG. 4, a flow diagram illustrates a process 400 implemented in one embodiment of the present invention. The process 400 identifies features that need to be updated due to a change in another feature and regenerates only those identified features as well as the modified feature. In the first step, parent/child relationships are discovered and analyzed beginning with the modified feature (step 402). In one embodiment, the data structure of the modified feature is examined to determine whether the data structure contains pointers to one or more child features. If such pointers exist, a list is created and identifying data for each child feature is inserted in the list (step 404). The child features are also analyzed to discover whether other child features exist (step 402), and if so identifying data for the other descendant features (e.g., grandchildren of the modified feature) are inserted in the list (step 404). By way of non-limiting example, the identifying data may be a pointer to or a name of the feature being identified. In an embodiment, rather than a list, a table or other data collection structure may store the identifying data. In other embodiments, instead of pointers, flags, field values or other indicators may be employed to indicate identifying data.

As previously discussed object attribute settings with reference to FIG. 3, a feature may have an adjacency relationship with another feature, in which case both features may need to be regenerated to preserve design intent if one of the features in the adjacency relationship is modified. The process 400 illustrated in FIG. 4 performs a topology check for features that have adjacent faces, edges, or vertices (step 406). The topology check begins with the modified feature. The data structure is searched and if a face, an edge, or a vertex that was created by another feature is found, identifying data of the other feature that created the face, edge, or vertex is added to the list (step 408).

In addition to or rather than performing a topology check, an embodiment may also perform a geometry check to discover whether features have common geometrical entities, such as common points, trimmed curves, or trimmed surfaces. If features share common geometrical entities, the features may have an adjacency relationship, in which case identifying data for those features will be added to the list.

The process 400 also checks whether features spatially intersect with one another (step 410). For any feature that spatially intersects with the modified feature or other features already identified in the list, identifying data is added to the list (step 412). In one embodiment, a bounding box is created surrounding the modified feature. Then for each of the remaining features another bounding box is created. Identifying data is added to the list for each feature having a bounding box that intersects the bounding box of the modified feature. This method of checking for spatial overlaps using bounding boxes is then performed for each feature identified in the list. As additional features are identified in the list, the additional features are also checked for spatial overlap with all other features.

The process 400 only makes incremental changes to the topology and geometry, while the topology and corresponding geometry of those features that are not regenerated are preserved. Thus, the process 400 then removes the faces that were generated by the modified feature and the features in the list from the topological structure of the three-dimensional model (step 414). Geometry associated with the faces may also be removed from the three-dimensional structure. In an embodiment, faces are modified rather than removed. Additionally, in some cases, entities may need to be reconstructed (e.g., healed) in order to maintain a valid model. In the next step of process 400, the features identified in the list are regenerated (step 416) then the process 400 ends (step 418).

In an embodiment, the present invention need not always regenerate a modified feature and the features identified in the list described with reference to FIG. 4. Instead, only the relevant data of the feature definition is modified as well as the topology and geometry in the final data structure. Referring back to FIG. 3 as an example, increasing the depth of the extruded cut 316 only requires the definition of the extruded cut 316 to be modified and the topology and associated geometry of the edge 318 to be modified. Moreover, the topology may remain unchanged and only the geometry needs to be modified.

Furthermore, an embodiment may store definitions of all faces of a feature in the feature data structure. By defining the faces, edges and vertices are easily derived. Moreover, faces contained in a topological structure of a part may have back pointers to the features from which the faces were defined. In this way, one of ordinary skill in the art can discover from which feature a face was created and only change the topological structure for the face and the corresponding geometry.

The process illustrated in FIG. 4 is shown as a sequential process for simplicity. However, those of ordinary skill in the art will understand that all features that are added to the list should be checked for parent/child, adjacent topological, and spatial relationships. Therefore, steps 402-412 should be repeated for those features having identifying data added to the list.

One of ordinary skill in the art has knowledge of a part's data format or can readily attain that knowledge. Such knowledge may be used to locate the beginning and end of a data block for a particular feature in a part's data structure, for example, by identifying header information for the feature and the size or length of the feature data. Knowledge of the data format of a part also enables one or ordinary skill in the art to locate a child pointer or a topological entity created by another feature.

Figure 5:
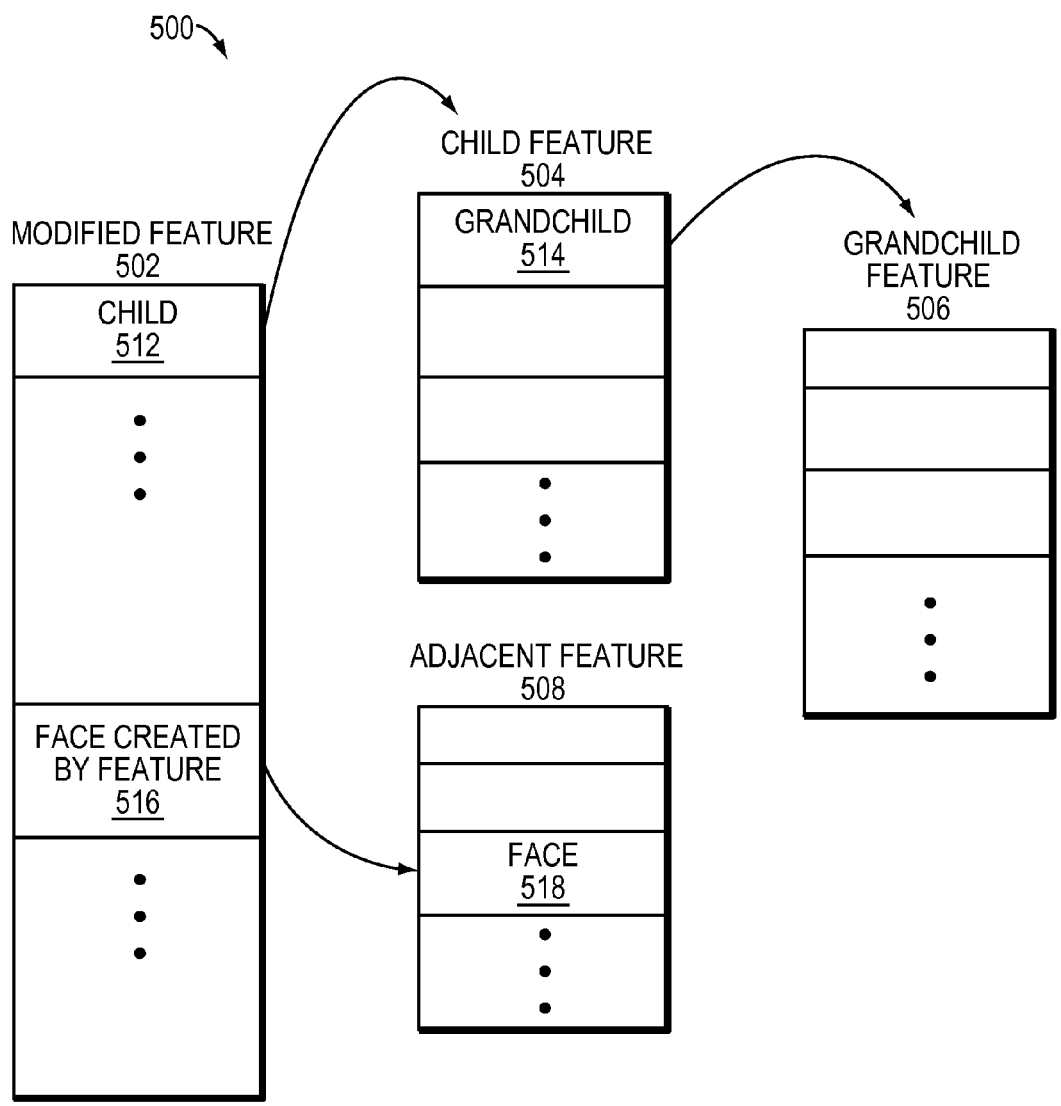
FIG. 5 is a block diagram of a data structure showing relationships of features in one embodiment if the present invention.

Referring now to FIG. 5, a conceptual illustration of a data structure 500 showing deployment of the list of FIG. 4 is shown. The data structure 500 is a snapshot in time that may change after a part is regenerated. The data structure 500 contains four features 502-508, some of which are related to one another via parent/child relationships. The data structure 500 may consist of other features as well that are not shown. A data structure of the modified feature 502 contains a pointer 512 to a data structure of a child feature 504, which in turn contains a pointer 514 to a data structure of a grandchild feature 506. The modified feature shares a face with an adjacent feature, and thus the data structure of the modified feature 502 contains a pointer 516 to the definition of the face 518 contained in the data structure of the adjacent feature 508. Due to the relationships amongst and between the four features 502-508, the present invention will regenerate all four features 502-508 when a change is made to feature 502.

An embodiment of the present invention may merge two or more faces belonging to different features into one face. If a face is detected that is a result of two merged faces and one of the merged faces belongs to a feature identified in the list referred to in FIG. 4 and the other merged face belongs to a feature not identified in the list referred to in FIG. 4, removing the face from the topological structure and associated geometry (as discussed with reference to step 414 in FIG. 4), can leave a hole in the model because the merged face belonging to the feature not identified in the list will not be regenerated. In this case, the present invention divides the face into two faces. By way of non-limiting example, a reverse merge or split operation may be applied to divide the merged face.

The discussion herein emphasized parts consisting of features. However, in addition to features, the data structure of a part may contain other types of entities. The foregoing discussion also applies to other types of entities defined as data structures apart from feature data structures. For example, an embodiment may include parameters that apply to specified features and are defined as separate data structures within a part, in which case, a modified parameter and only those features affected by the modified parameter need be regenerated.

Figure 6:
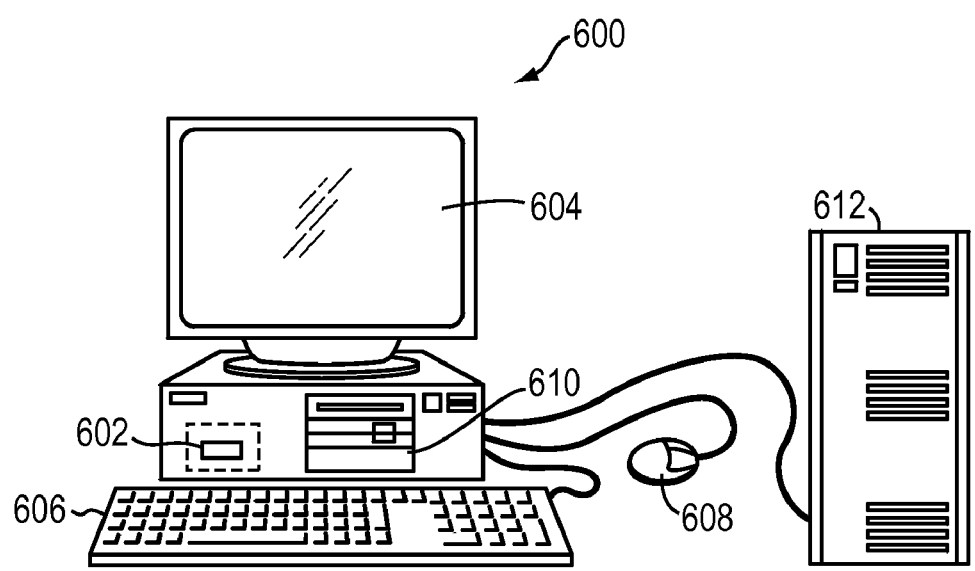
FIG. 6 is a schematic diagram of a computer system in which embodiments of the present invention are implemented.

Referring now to FIG. 6, a computerized modeling system 600 is shown and includes a CPU 602, a computer monitor 604, a keyboard input device 606, a mouse input device 608, and a storage device 610. The CPU 602, computer monitor 604, keyboard 606, mouse 608, and storage device 610 can include commonly available computer hardware devices. For example, the CPU 602 can include a Pentium-based processor. The mouse 608 may have conventional left and right buttons that the user may press to issue a command to a software program being executed by the CPU 602. As an alternative or in addition to the mouse 608, the computerized modeling system 600 can include a pointing device such as a trackball, touch-sensitive pad, or pointing device and buttons built into the keyboard 606. Other appropriate computer hardware platforms are suitable as will become apparent from the discussion that follows. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 600. Furthermore, the computerized modeling system 600 may include network hardware and software thereby enabling communication to a hardware platform 612, and facilitating communication between numerous computer systems that include a CPU and a storage system, among other computer components.

Computer-aided modeling software of the present invention may be stored on the storage device 610 and loaded into and executed by the CPU 602. The modeling software allows a user to create and modify a 3D model and implements aspects of the invention described herein. The CPU 602 uses the computer monitor 604 to display a 3D model and other aspects thereof as described. Using the keyboard 606 and the mouse 608, the user can enter and modify data associated with the 3D model. The CPU 602 accepts and processes input from the keyboard 606 and mouse 608. The CPU 602 processes the input along with the data associated with the 3D model and makes corresponding and appropriate changes to that which is displayed on the computer monitor 604 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. Implementations of the present invention may change the order in which operations are performed. For example, steps 406 and 408 can occur immediately after rather than before steps 410 and 412. Furthermore, depending on the needs of an implementation, particular operations described herein may be implemented as a combined operation, eliminated, added to, or otherwise rearranged. Additionally, the present invention may be implemented in computer-aided modeling software that represents CAD models as geometric models, solid models, surface models, or a combination thereof.

Accordingly, other embodiments are within the scope of the following claims.

What is claimed is:

1. A computer-readable data storage medium tangibly embodying instructions for updating a three-dimensional model by causing a computer to:

generate a three-dimensional model comprised of a plurality of components, wherein the plurality of components includes features of a feature-based model, said features comprising topological entities with supporting geometric entities;

modify one of the plurality of components in the three-dimensional model during an interactive modeling design session at an end-user computer;

determine which other ones of the plurality of components have a possible changing effect on the three-dimensional model as a result of said modifying the one of the plurality of components, wherein determining is by analyzing relationships existing among and between the modified one of the plurality of components and other ones of the plurality of components, and said analyzing resulting in identifying said other ones of the plurality of components having relationships with the modified one of the plurality of components;

during the interactive modeling design session at the end-user computer, construct a modified version of the three-dimensional model by regenerating the geometric entities of the features of the modified one of the plurality of components and of the determined other ones of the plurality of components having the possible changing effect on the three-dimensional model and identified as having relationships with the modified one of the plurality of components while not regenerating the geometric entities of features of remaining ones of the plurality of components not having the possible changing effect on the three-dimensional model and not identified as having relationships with the modified one of the plurality of components, wherein said constructing the modified version achieves a same result as revising the three-dimensional model by regenerating each of the plurality of components.

2. The data storage medium of claim 1, wherein the features include any one or more of bosses, fillets, chamfers, cuts, holes, shells, lofts and sweeps; and the modified one of the plurality of components is one of said features and a parameter.

3. The data storage medium of claim 1, wherein the instructions to determine other ones of the plurality of components having the possible changing effect further comprises instructions for causing a computer to:

examine the modified one of the plurality of components to discover an existence of a parent-child relationship with one of the other ones of the plurality of components, wherein the modified one is a parent component of one of the other ones of the plurality of components.

4. The data storage medium of claim 1, wherein the instructions to determine other ones of the plurality of components having the possible changing effect further comprises instructions for causing a computer to:

examine the modified one of the plurality of components to discover an existence of a topological relationship with one of the other ones of the plurality of components, wherein the modified one and one of the other ones of the plurality of components have an adjacent topological entity.

5. The data storage medium of claim 1, wherein the instructions to determine other ones of the plurality of components having the possible changing effect further comprises instructions for causing a computer to:

calculate at least one extent of the modified one of the plurality of components to compare with a location of at least one of the other ones of the plurality of components and determine an intersection of the modified one of the plurality of components and at least one of the other ones of the plurality of components.

6. The data storage medium of claim 1, further comprising instructions for causing a computer to:

construct a representation of the three-dimensional model comprised of a plurality of topological entities; and remove ones of the plurality of topological entities constructed prior to modifying the one of the plurality of components and associated with the other ones of the plurality of components.

7. The data storage medium of claim 1, further comprising instructions for causing a computer to:

construct a representation of the three-dimensional model comprised of a plurality of topological entities; and modify ones of the plurality of topological entities constructed prior to modifying the one of the plurality of components to reflect a topological result from regenerating the modified one of the plurality of components and the other ones of the plurality of components.

8. The data storage medium of claim 7, further comprising instructions for causing a computer to reconstruct at least one of the plurality of topological entities to maintain a valid model.

9. A computer-implemented method for updating a computer-aided design model, the method comprising:

defining the computer-aided design model as a plurality of components, the plurality of components including features of a feature-based model, features comprising topological entities with supporting geometric entities;

applying a modification to a first component in the computer-aided design model during an interactive modeling design session at an end-user computer, wherein the first component is one of the plurality of components;

analyzing the plurality of components for determining an existence of a relationship among and between the first component and other ones of the plurality of components;

discovering the relationship between the first component and a second component, wherein the second component is one of the plurality of components;

storing identifying data for the second component in a data structure;

examining the second component to determine whether other relationships exist between the second component and other ones of the plurality of components;

adding respective identifying data to the data structure for the other ones of the plurality of components having determined other relationships with the second component; and during the interactive modeling design session at the end-user computer, regenerating the geometric entities of the features of the first component and of the ones of the plurality of components identified by the identifying data in the data structure as having relationships among and between the first component and the second component, and the second component and other ones of the plurality of components while not regenerating the geometric entities of features of other ones of the plurality of components not identified by the identifying data as having relationships among and between the first component and the second component, and the second component and other ones of the plurality of components, wherein regenerating constructs a modified version of the computer-aided design model identical to the computer-aided design model revised by regenerating each one of the plurality of components.

10. The computer-implemented method of claim 9, wherein the relationship between the first component and the second component is one of a parent-child relationship, an adjacency relationship, and a spatial overlap relationship.

11. The computer-implemented method of claim 10, wherein the adjacency relationship is caused by the first component and the second component sharing a same topological entity.

12. The computer-implemented method of claim 10, further comprising:

creating a first bounding box surrounding the first component;

creating a second bounding box surrounding the second component;

detecting an intersection between the first bounding box and the second bounding box; and determining the spatial overlap relationship exists due to the intersection.

13. The computer-implemented method of claim 9, wherein the other relationships are in the group of a parent-child relationship, an adjacency relationship, and a spatial overlap relationship.

14. The computer-implemented method of claim 9, wherein the features in the plurality of components include any one or more of bosses, fillets, chamfers, cuts, holes, shells, lofts and sweeps; and the first component is one of said features or a parameter.

15. The computer-implemented method of claim 9, further comprising:

constructing a representation of the computer-aided design model comprised of a plurality of topological entities and a corresponding plurality of geometric entities; and removing ones of the plurality of topological entities constructed prior to applying the modification to the first component and associated with the ones of the plurality of components identified by the identifying data.

16. The computer-implemented method of claim 9, further comprising:

constructing a representation of the computer-aided design model comprised of a plurality of topological entities; and modifying ones of the plurality of topological entities constructed prior to applying the modification to the first component in accordance with a result from regenerating the first component and the ones of the plurality of components identified by the identifying data.

17. The computer-implemented method of claim 9, wherein:

at least one of the first component and the second component is a feature;

the feature has a face merged with an other face belonging to an other feature not identified by the identifying data; and the face and the other face are separated prior to regenerating the first component and ones of the plurality of components identified by the identifying data.

18. A computer-aided design system comprising:

a digital processor operatively coupled to a data storage system, the data storage system storing a three-dimensional model; and a data storage memory operatively coupled to the digital processor and comprising instructions to configure the processor to:

construct the three-dimensional model comprised of a plurality of components, the plurality of components including features of a feature-based model, features comprising topological entities with supporting geometric entities;

modify one of the plurality of components in the three-dimensional model during an interactive modeling design session at an end-user computer;

analyze other ones of the plurality of components to determine an existence of one of a dependency on the modified one of the plurality of components and other relationships among and between the plurality of components including the modified one of the plurality of components, said analyzing resulting in determined ones of the plurality of components identified as having one of the dependency on the modified one of the plurality of components and other relationships among and between the plurality of components including the modified one of the plurality of components; and during the interactive modeling design session at the end-user computer, regenerating the three-dimensional model by regenerating the geometric entities of the features of only the modified one of the plurality of components and of the determined ones of the plurality of components identified as having the dependency or other relationships, wherein regenerating the three-dimensional model produces a same revised model as produced by regenerating each one of the plurality of components.

19. The computer-aided design system of claim 18, wherein the dependency is one of a parent-child dependency and a topological dependency.

20. The computer-aided design system of claim 18, further comprising instructions to configure the processor to determine that the modified one of the plurality of components overlaps geometrically with one of the other ones of the plurality of components.

* * * * *